(12) United States Patent
Morin (10) Patent No.: US 7,290,987 B1
(45) Date of Patent: Nov. 6, 2007

(54) IMPELLER HUB FOR TORQUE CONVERTER

(75) Inventor: Michael G. Morin, Keene, NH (US)

(73) Assignee: Sonnax Industries, Inc., Bellews Falls, VT (US)

( * ) Notice: Subject to any disclaimer, the term of this patent is extended or adjusted under 35 U.S.C. 154(b) by 511 days.

(21) Appl. No.: 10/966,590

(22) Filed: Oct. 14, 2004

Related U.S. Application Data (60) Provisional application No. 60/510,655, filed on Oct. 14, 2003.

(51) Int. Cl.
*F16D 33/18* (2006.01)
(52) U.S. Cl. .............. 416/171; 416/174; 416/180; 416/197 C; 416/213 A; 416/244 R; 415/216.1; 415/229; 415/230; 60/330; 60/358; 384/276
(58) Field of Classification Search .............. 416/180, 416/197 C, 174, 213 R, 213 A, 244 R, 244 A, 416/170 R, 171; 415/121.1, 123, 216.1, 415/229, 230; 60/330, 358; 384/276

See application file for complete search history.

(56) References Cited

U.S. PATENT DOCUMENTS 3,518,026 A * 6/1970 Iijima .................... 416/197 C
3,572,034 A * 3/1971 Fisher .......................... 60/341

* cited by examiner

Primary Examiner—Christopher Verdier
(74) Attorney, Agent, or Firm—Clifford F. Rey (57) ABSTRACT

A direct replacement impeller hub for the torque converter of an automatic transmission and a method of repairing an impeller assembly utilizing the replacement impeller hub to provide increased service longevity. In the present impeller hub the geometric roundness characteristic of the impeller hub is controlled to an exacting tolerance during the manufacturing process in accordance with American National Standards Institute (ANSI) definitions to provide a close tolerance fit within a mating bearing sleeve. The present impeller hub is also finish ground in accordance with ANSI definitions to reduce surface friction and to provide an optimal sealing surface for engagement with a radial seal, which is disposed about the impeller hub sealing it to prevent contaminants from entering the hydraulic pump of the transmission. The present impeller hub also includes additional structural features such as fillet radii machined on selected features to facilitate assembly of the torque converter.

20 Claims, 11 Drawing Sheets

IMPELLER HUB FOR TORQUE CONVERTER

CROSS-REFERENCE TO RELATED APPLICATIONS

This application claims the benefit under 35 U.S.C. 119(e) of U.S. Provisional Patent Application No. 60/510,655 filed Oct. 14, 2003 entitled Impeller Hub for Torque Converter.

BACKGROUND OF INVENTION

The present invention relates to torque converters for automatic transmissions in land vehicles and, more particularly, to an impeller hub, which comprises a part of the impeller assembly in such a torque converter.

The torque converter of an automatic transmission replaces the clutch used in manual transmissions. It is the primary component for transmittal of power between the engine and the transmission in an automotive vehicle. The basic principle of torque converter operation can be observed by placing the blades of two electric fans opposite each other and turning on one of the fans. If one of the fans is turned on, the force of the air column produced will act upon the motionless blades of the other fan, which will begin turning and eventually reach a speed approaching the speed of the powered fan. The torque converter employs an analogous mechanism using automatic transmission fluid (hereinafter "ATF") to provide a fluid coupling between the engine and the transmission of an automobile, which provides for a smooth conversion of torque from the engine to the mechanical components of the transmission.

In a typical rear-wheel drive vehicle the torque converter is bolted to the engine crankshaft at its forward end so that it will rotate at engine speed. The torque converter is supported at its aft end by an impeller hub, which typically engages the hydraulic pump. Because the impeller hub projects through the transmission case and is exposed to exterior dirt and contaminants, premature wear of the mating bearing and seal can occur resulting in eventual failure of the torque converter. Thus, the present invention has been developed to resolve this problem and other shortcomings of the prior art.

SUMMARY OF THE INVENTION

Accordingly, the present invention is a replacement impeller hub for use in an impeller assembly within the torque converter of an automatic transmission. Critical to the present invention, the geometric roundness characteristic of the impeller hub is controlled to 0.0003 inch during the present manufacturing process in accordance with American National Standards Institute (hereinafter "ANSI") Y 14.5M definitions to provide a close tolerance fit and to maximize surface-to-surface contact with its mating bearing sleeve located within the hydraulic pump. Conformance to this 0.0003 roundness characteristic has been demonstrated to substantially improve the service longevity of the impeller hub and pump bearing.

The present impeller hub is also finish ground in accordance with ANSI Y 14.36M definitions to provide a fine surface texture reducing surface friction and providing an optimal sealing surface for engagement with a radial lip seal, which is disposed about the impeller hub surface sealing it to prevent contaminants from entering the hydraulic pump. The present impeller hub is also induction hardened in accordance with industry specification MIL-H-6875 to improve abrasion resistance and to reduce mechanical wear.

The present impeller hub also includes modified pump engaging structures for driving engagement of a mating pump gear in the pump of the transmission. There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
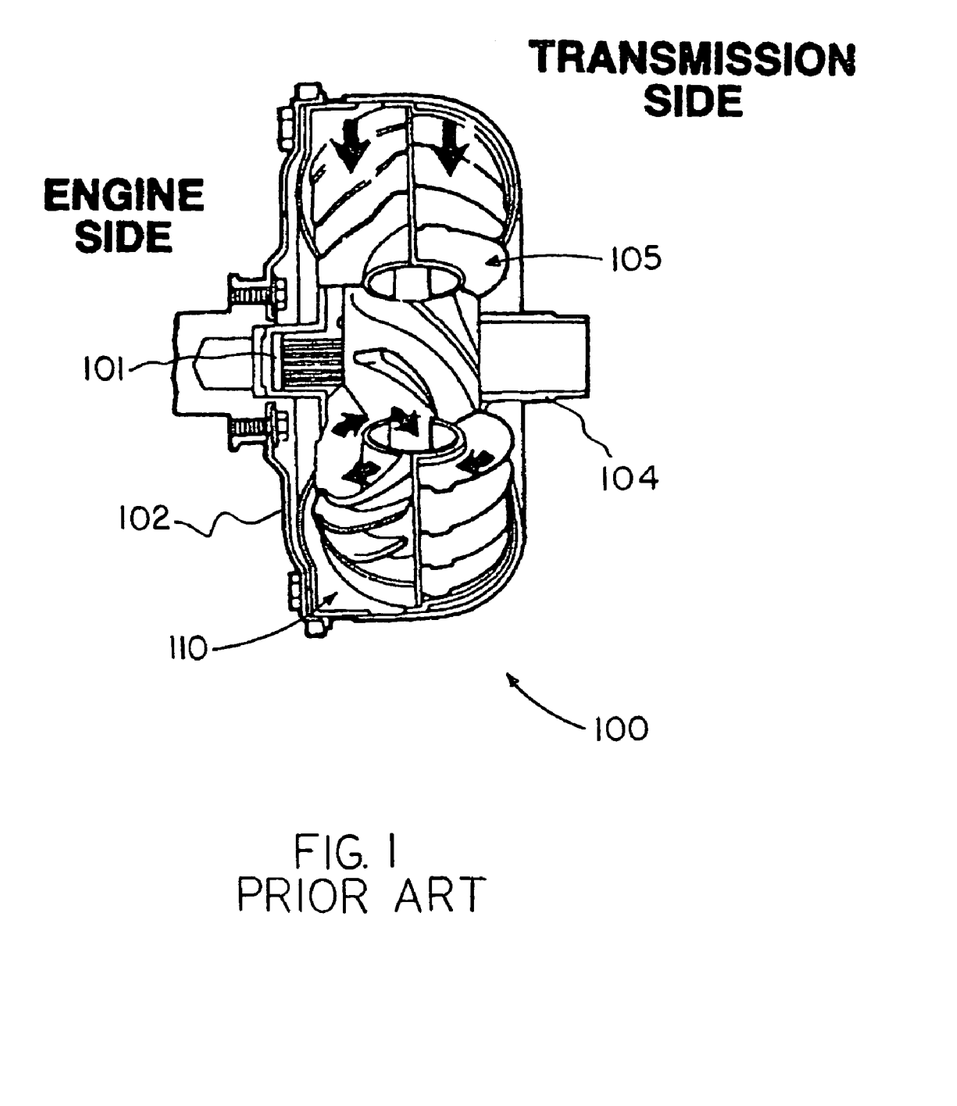
FIG. 1 is a partially cutaway, longitudinal section view of a torque converter assembly wherein the impeller hub of the present invention is utilized and is labeled Prior Art.
Figure 2:
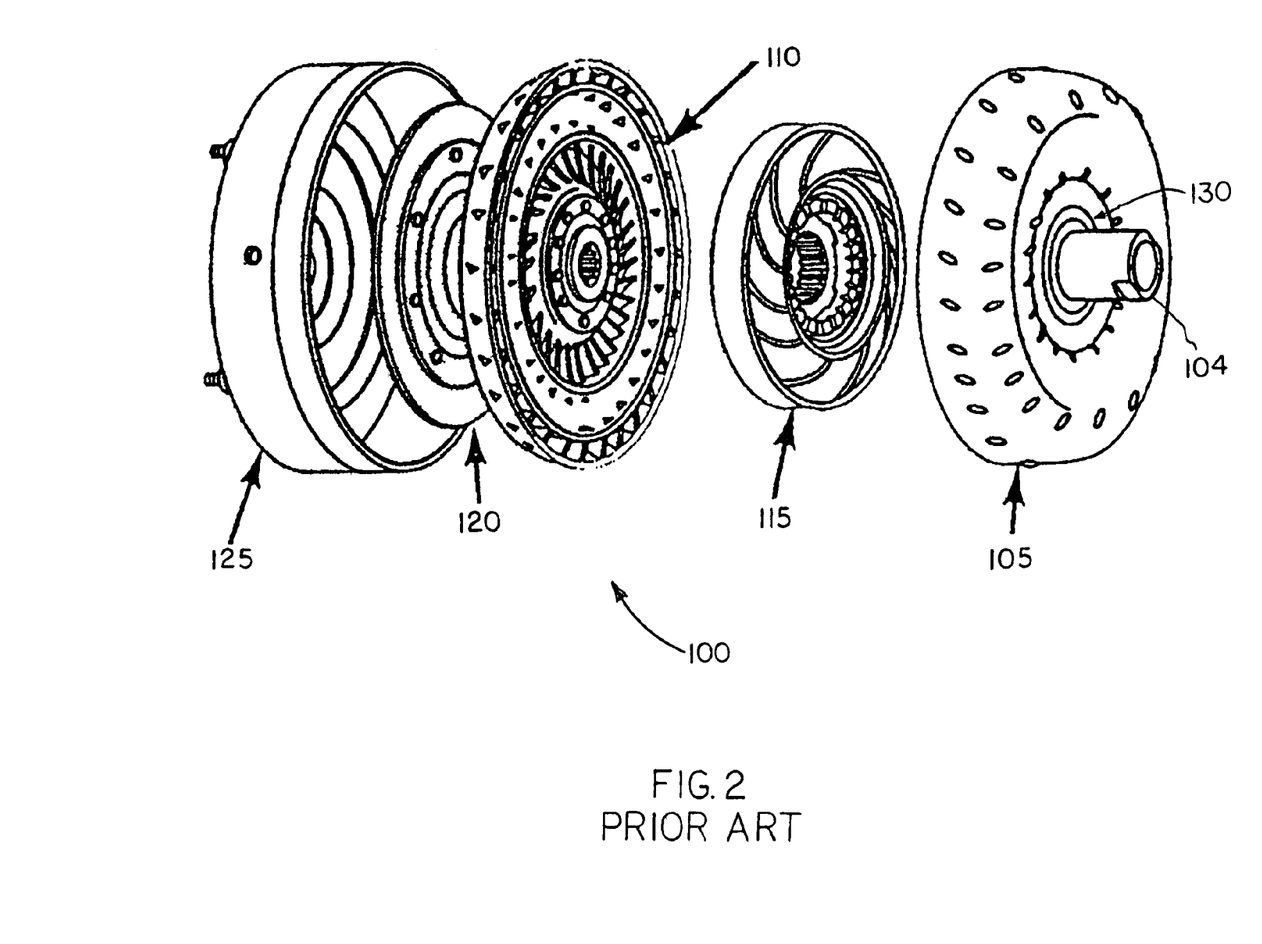
FIG. 2 is an exploded perspective view of a torque converter assembly illustrating the main sub-assemblies thereof and is labeled Prior Art.

Prior to describing the present invention in detail, it may be beneficial to briefly review the structure and function of the torque converter of an automatic transmission. The torque converter is the primary component for transmittal of power between the engine and the automatic transmission or transaxle in an automotive vehicle. As shown in FIGS. 1 and 2, the torque converter assembly, indicated generally at 100, is bolted to the engine flywheel 102 (also known as the flexplate) so that it will rotate at engine speed. The torque converter assembly 100 provides for a smooth conversion of torque from the engine to the mechanical components of the transmission. The torque converter assembly 100 also functions to multiply torque from the engine enabling the vehicle to achieve additional performance when necessary.

The torque converter assembly 100 is made up of the following main sub-assemblies: (1) an impeller or converter pump assembly, indicated generally at 105, which is the driving member; (2) a turbine assembly, indicated generally at 110, which is the driven or output member; (3) a stator assembly, indicated generally at 115 (FIG. 2), (4) a pressure plate assembly, indicated generally at 120 (FIG. 2), splined to the turbine assembly 110 to enable direct mechanical drive; and (5) a converter housing cover assembly, indicated generally at 125 (FIG. 2), which is welded to the impeller assembly 105.

Figure 3:
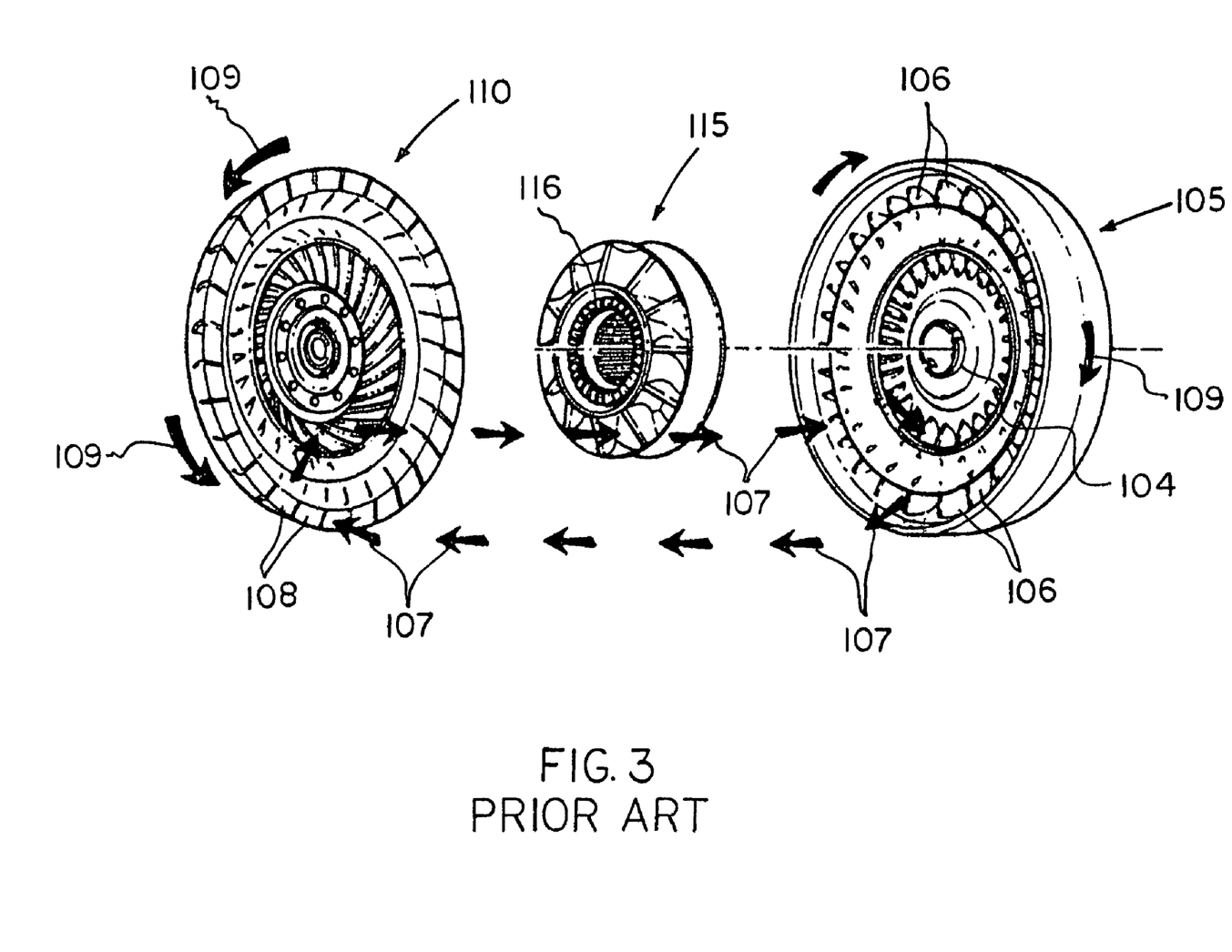
FIG. 3 is an exploded perspective view of the turbine, stator, and impeller assemblies of FIG. 2 illustrating the flow of automatic transmission fluid therein and is labeled Prior Art.

When the engine is running, the impeller assembly 105 acts as a centrifugal pump by picking up ATF at its center and discharging it at its rim between the impeller blades 106 as shown by the smaller directional arrows 107 in FIG. 3. The force of this fluid hits the turbine blades 108 and causes the turbine assembly 110 to rotate as indicated by the larger directional arrows 109. As the engine and impeller assembly 105 increase in revolutions per minute (hereinafter "RPM"), so does the turbine assembly 110.

The pressure plate assembly 120 is splined to the turbine hub 101 (FIG. 1) and engages with the converter cover 125 (FIG. 2) to provide a mechanical coupling of the engine to the transmission during converter lock-up. When the pressure plate assembly 120 is applied, the small amount of slippage that occurs through the fluid coupling is eliminated thereby providing a more efficient transfer of engine torque to the drive wheels as required.

The stator assembly 115 is located between the impeller assembly 105 and the turbine assembly 110 and is mounted on a one-way roller clutch 116 (FIG. 3) that allows it to rotate in only one direction. The function of the stator assembly 115 is to redirect fluid returning from the turbine assembly 110 as shown by directional arrows 107 to assist the engine in turning the impeller assembly 105 as illustrated in FIG. 3.

The impeller assembly 105 is supported by an impeller hub 104 (FIGS. 1 and 2), which extends through the impeller assembly 105 along its longitudinal axis and resides in a mating sleeve bearing (not shown) installed in the hydraulic pump 200 (FIG. 7A) in a rear wheel drive vehicle. The transmission input shaft (not shown) extends through the impeller hub 104 and into the transmission. The impeller hub 104 is designed to engage a mating pump gear 160 or 160' (FIGS. 7B-7C), depending upon its configuration in a given transmission.

Figure 7A:
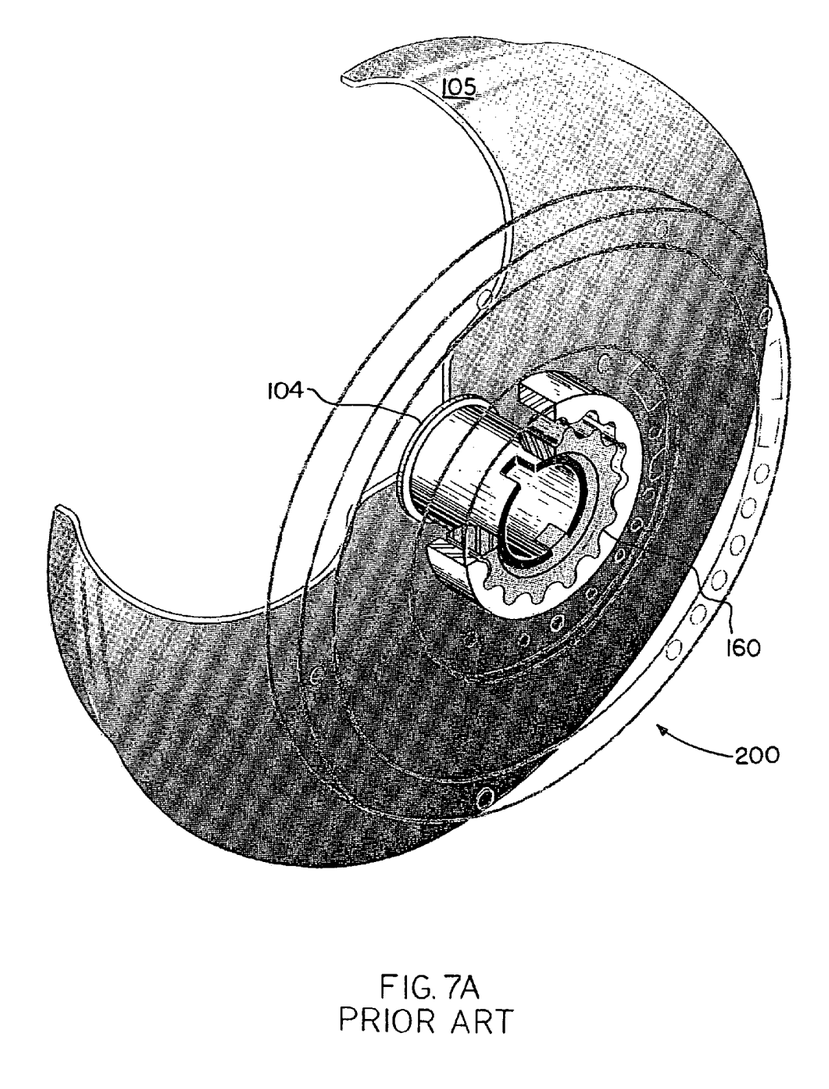
FIG. 7A is a partially cutaway perspective view of the impeller housing showing the impeller hub positioned in engagement with the hydraulic pump.

Because the impeller hub 104 extends through the transmission case and into the pump 200, the impeller hub 104 is exposed to external dirt and contaminants, which can result in premature wear of the mating bearing and radial lip seal (not shown) that locate on the hub 104 after assembly is complete as shown in FIG. 7A resulting in loss of line pressure and eventual failure of the torque converter. Thus, the present invention has been developed to resolve this problem and other shortcomings of the prior art.

Figure 4A:
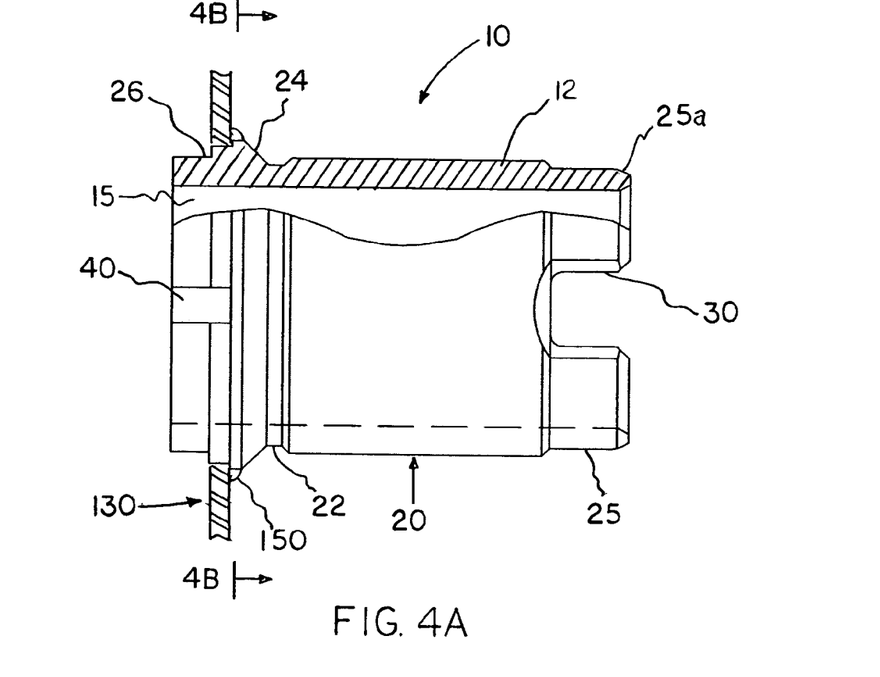
FIG. 4A is a partial longitudinal section view of an embodiment of the impeller hub of the present invention.
Figure 4B:
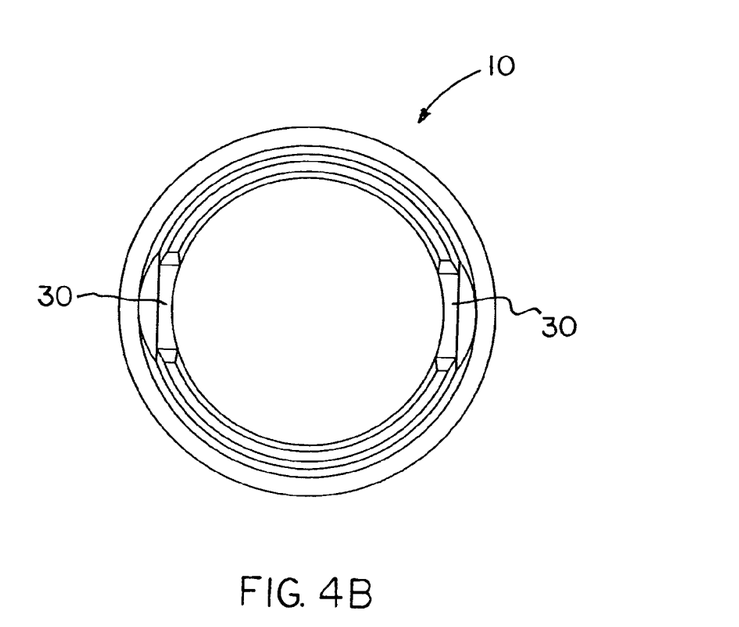
FIG. 4B is a cross-sectional view of the present impeller hub taken along the section line 4B-4B of FIG. 4A.

With reference to FIGS. 4A-4B there is shown therein an impeller hub in accordance with the present invention, indicated generally at 10. In the embodiment shown in FIGS. 4A-4B, impeller hub 10 comprises a generally tubular body member 12 having a cylindrical bore 15 extending the length thereof. The impeller hub 10 includes a bearing journal 20, which is precision ground to a close tolerance dimension to fit a mating pump bearing located in the pump 200 (FIG. 7A).

Critical to the present invention, the geometric roundness characteristic of the bearing journal 20 is controlled to 0.0003 inch maximum during manufacturing in accordance with ANSI Y 14.5M definitions to provide a close tolerance fit within the mating pump bearing.

In the standard practice bearing journal 20 is machined utilizing a centerless grinding process that inherently tends to produce a bearing journal 20, which is slightly tri-lobular in cross-section resulting in ATF leakage through the hub seal (not shown) and reduced line pressure. However, use of selected grinding wheels matched to the heat treated materials and refinement of machine set-ups and operator techniques imposed by the present manufacturing method have enabled compliance with the 0.0003 inch roundness characteristic. Conformance to this geometric roundness characteristic has been demonstrated to substantially improve the service longevity of the impeller hub 10 and mating pump bearings and seals.

Also critical to the present invention is finish grinding the bearing journal 20 to a fine surface texture. In the present impeller hub 10 the surface finish of the bearing journal 20 is initially controlled to "16 or better" in accordance with ANSI Y 14.36M definitions. Thereafter, the journal is polished using fine abrasive materials to provide an optimal sealing surface for the hub seal (not shown) and increased service longevity.

Advantageously, the present impeller hub 10 is fabricated from a high quality steel material in accordance with industry specification AISI 1035 and is induction hardened in accordance with heat treatment specification MIL-H-6875G to a Rockwell scale hardness of HRC 30-35. Induction hardening the impeller hub 10 provides improved abrasion resistance thereby reducing mechanical wear and also increases service longevity.

Impeller hub 10 is provided with an annular weld relief groove 22 which provides for runoff of any weld splatter as at 150 extending onto the tapered surface 24 of the body member 12 after the impeller hub 10 is attached to impeller housing 130 (FIG. 4) by weldment.

The present impeller hub 10 also provides structures and functional features, which comprise pump-engaging means including, but not limited to, the following structures. In the embodiment shown in FIGS. 4A-4B it can be seen that impeller hub 10 includes a pilot diameter 25 having a lateral notch 30, which is configured to engage mating driven members 155 in a pump gear, indicated generally at 160, and shown in FIG. 7B. The lateral notch 30 mechanically interlocks with the mating driven members 155 to drive the pump gear 160 at engine speed to maintain hydraulic pressure throughout the transmission.

Figure 7B:
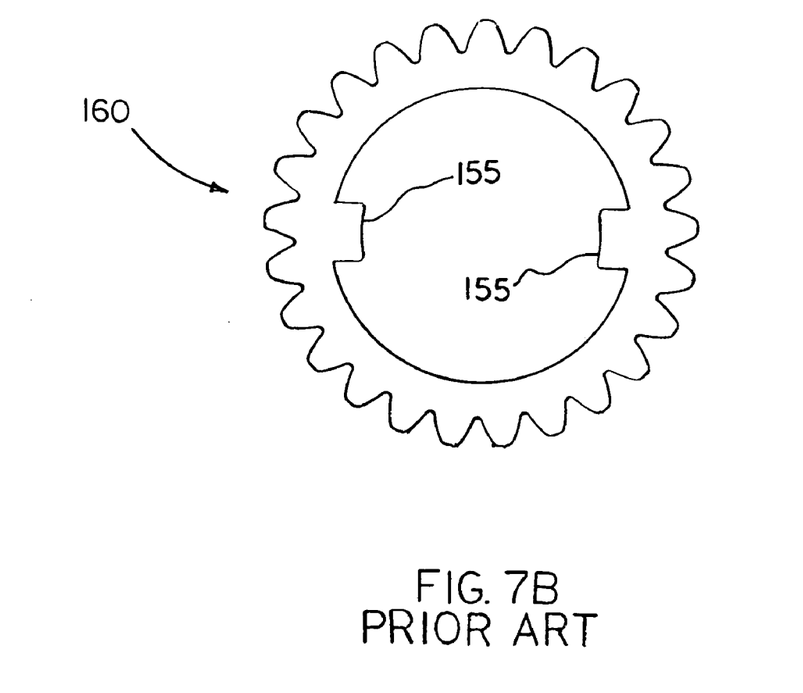
FIG. 7B is a plan view of an original equipment pump gear of the type which is driven by the present impeller hub shown in FIG. 4A and is labeled Prior Art.
Figure 7C:
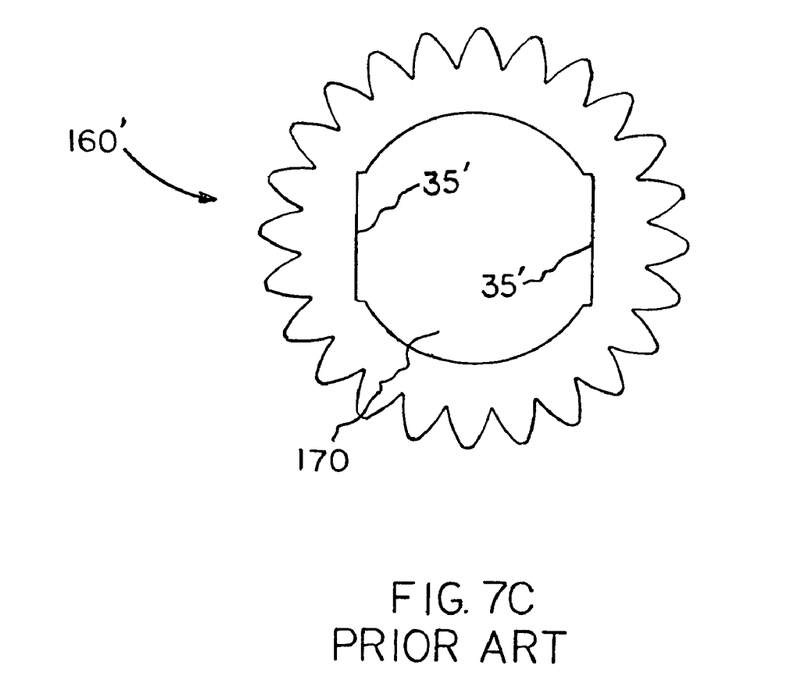
FIG. 7C is a plan view of an original equipment pump gear of the type which is driven by the present impeller hub shown in FIGS. 5B and 5C and is labeled Prior Art.

In another embodiment (FIGS. 5B-5C) it can be seen that impeller hub 10' includes a pilot diameter 25 having a pair of diametrically opposed, parallel flats 35 machined thereon for driving engagement within a so-called double D-shaped bore 170 having mating opposed flats 35' formed within the pump gear 160' as shown in FIG. 7C.

Referring again to FIGS. 4A-4B the terminal end of pilot diameter 25 includes a fillet radius 25*a* in accordance with the present invention to prevent damage (i.e. cutting) to a mating O-ring seal (not shown) disposed within the hydraulic pump during installation of the pilot diameter 25 into the pump. The fillet radius measureS in the range of 0.040-0.060 inch. In addition, the junctures of flats 35 with the aft end face 25*b* of the impeller hub 10' typically produces a sharp corner as at 25*c* (FIGS. 5A-5C), which hinders the sliding engagement of pilot diameter 25 within the double D-shaped bore 170 (FIG. 7 B) during assembly. In accordance with the present invention, impeller hub 10' is provided with a fillet radius 25*c* at each of the corner junctures of flats 35 with the aft end face 25*b*. The fillet radii formed at 25*c* are in the range of 0.025-0.075 inch.

As shown in FIG. 4A the present impeller hub 10 includes a slot 40 extending transversely across a shoulder diameter 26 at an opposite end thereof, which receives a thrust washer (not shown) having mating radial tabs that limit axial movement of the impeller assembly 105 within the torque converter assembly 100.

Figure 5A:
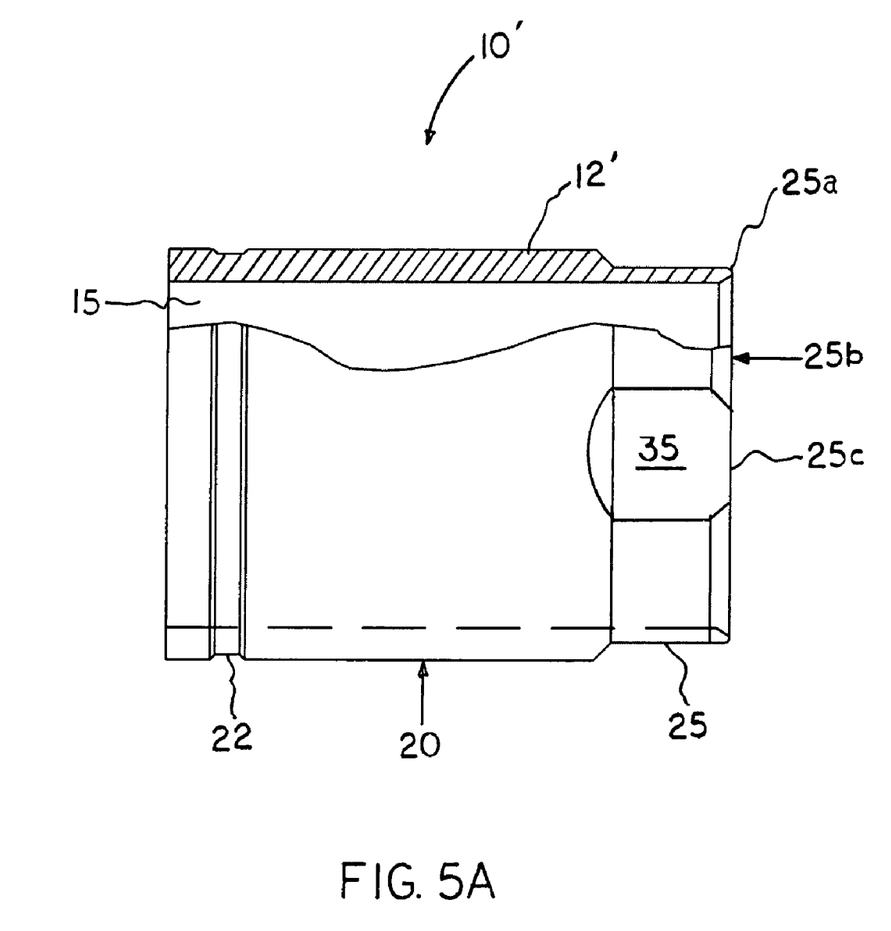
FIG. 5A is a partial longitudinal section view of another embodiment of the impeller hub of the present invention.
Figure 5B:
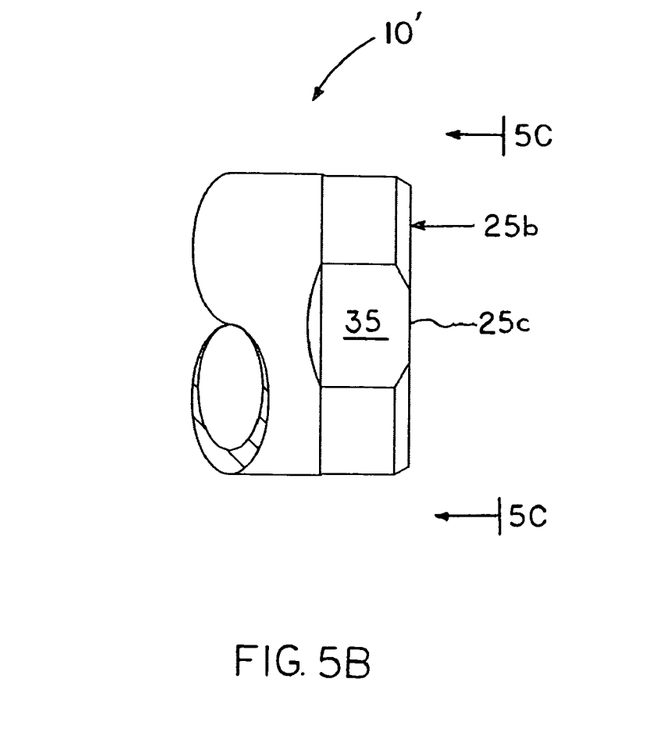
FIG. 5B is a detail sectional view of the present impeller hub illustrated in FIG. 5A rotated 90° axially showing the ground flat feature.
Figure 5C:
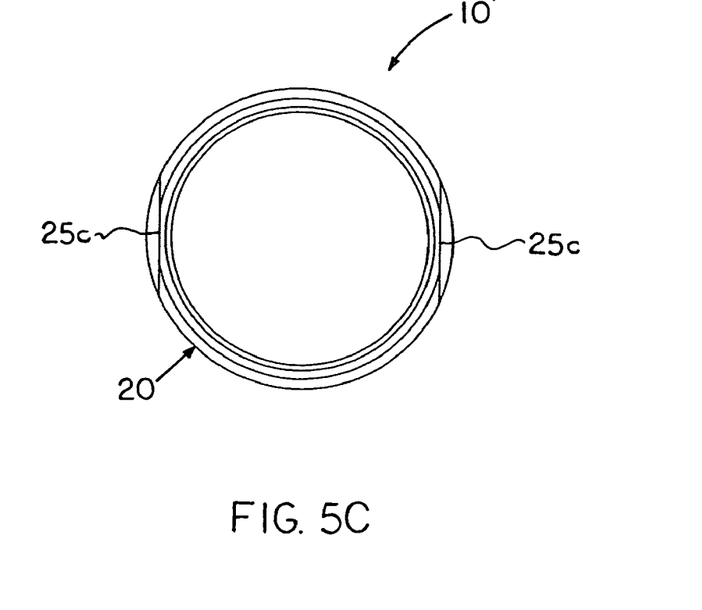
FIG. 5C is an end view of the present impeller hub taken along the section line 5C-5C of FIG. 5B.

In another embodiment shown in FIGS. 5A-5C, impeller hub 10' also comprises a generally tubular body member 12' having a cylindrical bore 15 extending along its entire length. The impeller hub 10' includes a bearing journal 20, which is precision ground to a close tolerance dimension to fit a mating bearing sleeve (not shown) located in the pump.

In this embodiment the geometric roundness characteristic of the bearing journal 20 is also controlled to 0.0003 inch maximum during the present manufacturing process in accordance with specification ANSI Y 14.5M definitions to provide a close tolerance fit within the mating bearing sleeve.

In the present impeller hub 10' the surface finish of the bearing journal 20 is also ground to a surface texture of 16 or better in accordance with specification ANSI Y 14.36M definitions to reduce mechanical wear and polished with fine grit abrasive cloth to provide an optimal sealing surface for the radial lip seal (not shown), which engages the bearing journal 20 preventing ATF leakage from the pump 200 and also shielding against infiltration of contaminants.

Similarly, the present impeller hub 10' is fabricated from a high quality steel in accordance with material specification AISI 1035 and is also induction hardened in accordance with specification MIL-H-6875G to a Rockwell scale hardness of HRC 30-35. As previously stated through-hardening the impeller hub 10' provides improved service longevity by increasing the abrasion resistance of bearing journal 20.

Impeller hub 10' is also provided with an annular weld relief groove 22, which provides runoff/clearance for any weld overrun after impeller hub 10' is attached to hub flange 25 by weldment.

Referring again to FIGS. 5A-5C it can be seen that impeller hub 10' includes a pilot diameter 25 having a pair of diametrically opposed flats machined thereon, which engage a matching, double D-shaped opening within pump gear 160' in the pump 200. In this embodiment the terminal end of pilot diameter 25 also includes a fillet radius 25*a* machined thereon to prevent cutting of a mating O-ring seal disposed within pump 200 during installation of the pilot diameter 25 into the pump. In addition, the junctures of flats 35 with the aft end face 25*b* of the impeller hub 10' typically exhibit a sharp corner as at 25*c* (FIGS. 5A-5C) after machining, which hinders the sliding engagement of pilot diameter 25 within the double D-shaped bore 170 (FIG. 7 C) of pump gear 160' during assembly. Thus, the present impeller hub 10' is provided with a fillet radius 25*c* at each of the corner junctures of flats 35 with the aft end face 25*b*. The fillet radii formed at 25*c* are in the range of 0.025-0.075 inch.

Figure 6A:
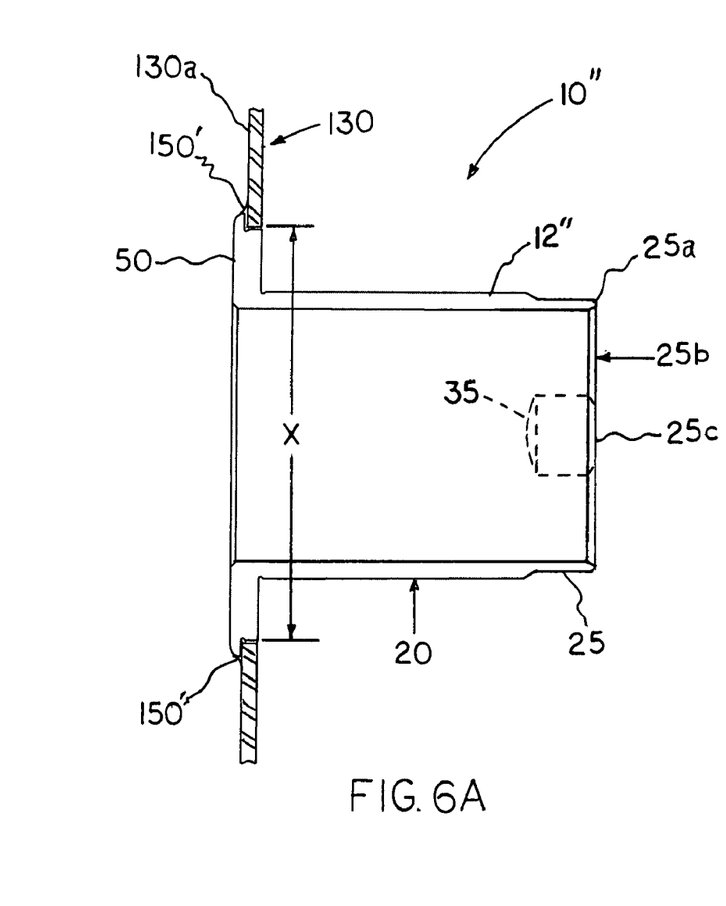
FIG. 6A is a longitudinal cross-section view of another embodiment of the present impeller hub shown in its position within the impeller housing.
Figure 6B:
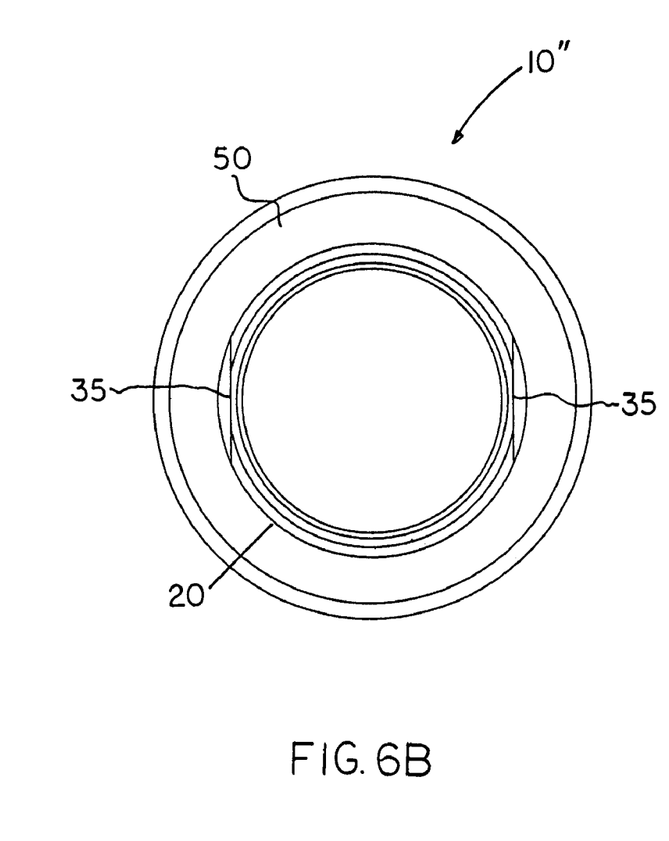
FIG. 6B is a right end view of the present impeller hub of FIG. 6A.

In another embodiment shown in FIGS. 6A-6B, impeller hub 10" also comprises a generally tubular body member 12" having a cylindrical bore 15 extending its entire length. In this embodiment the impeller hub 10" includes a circular weld flange 50, which is formed in perpendicular relation to the longitudinal axis of the hub 10". The impeller hub 10" also includes a bearing journal 20, which is precision ground to a close tolerance dimension to fit a mating pump bearing in the pump 200.

In this embodiment the geometric roundness characteristic of the bearing journal 20 is also controlled to 0.0003 inch during the manufacturing process in accordance with ANSI Y 14.5M definitions to provide a close tolerance fit within the mating pump bearing. Further, the surface finish of the bearing journal 20 on hub 10" is held to 16 or better in accordance with ANSI Y 14.36M definitions to reduce mechanical wear and to provide an optimal sealing surface.

The present impeller hub 10" is also fabricated from a high quality steel material in accordance with specification AISI 1035 and is induction hardened in accordance with specification MIL-H-6875G to a Rockwell scale hardness of HRC 30-35 improve service longevity as described hereinabove.

As shown in FIGS. 6A-6B it can be seen that impeller hub 10" also includes a pilot diameter 25 having a pair of diametrically opposed flats 35 machined thereon, which engage a mating, double D-shaped opening within pump gear 160' (FIG. 7B) during assembly. In this embodiment the terminal end of pilot diameter 25 is also provided with a fillet radius 25*a* machined thereon to prevent damage to a mating O-ring seal disposed within the ATF pump 200 during installation of the pilot diameter 25 into the pump.

As in the previous embodiments, the junctures of flats 35 with the aft end face 25*b* of the impeller hub 10" typically exhibit a sharp corner as at 25*c* (see FIG. 5B) after machinging, which hinders the sliding engagement of pilot diameter 25 within the double D-shaped bore 170 (FIG. 7 B) at assembly. Thus, the present impeller hub 10" is also provided with a fillet radius 25*c* at each of the corner junctures of flats 35 with the aft end face 25*b*. The fillet radii formed at 25*c* is in the range of 0.025-0.075 inch depending on the transmission application.

Referring again to FIGS. 6A-6B it can be seen that the annular weld relief groove 22, which provides for runoff/clearance of weld overrun in the previous embodiments is omitted from the impeller hub 10". In this embodiment the impeller hub 10" is welded to the inner surface of the impeller housing 130 to avoid weld splatter onto the bearing journal 20.

Figure 8A:
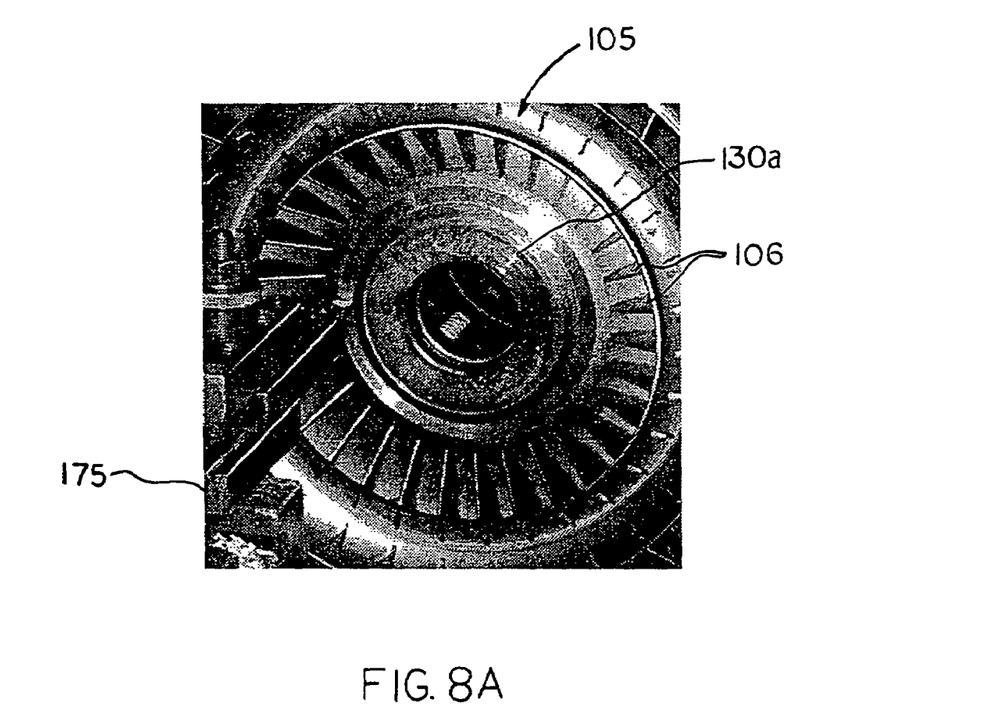
FIG. 8A is a perspective view of the interior of an impeller assembly illustrating a resurfacing operation on an engine lathe in accordance with a repair method of the present invention.
Figure 8B:
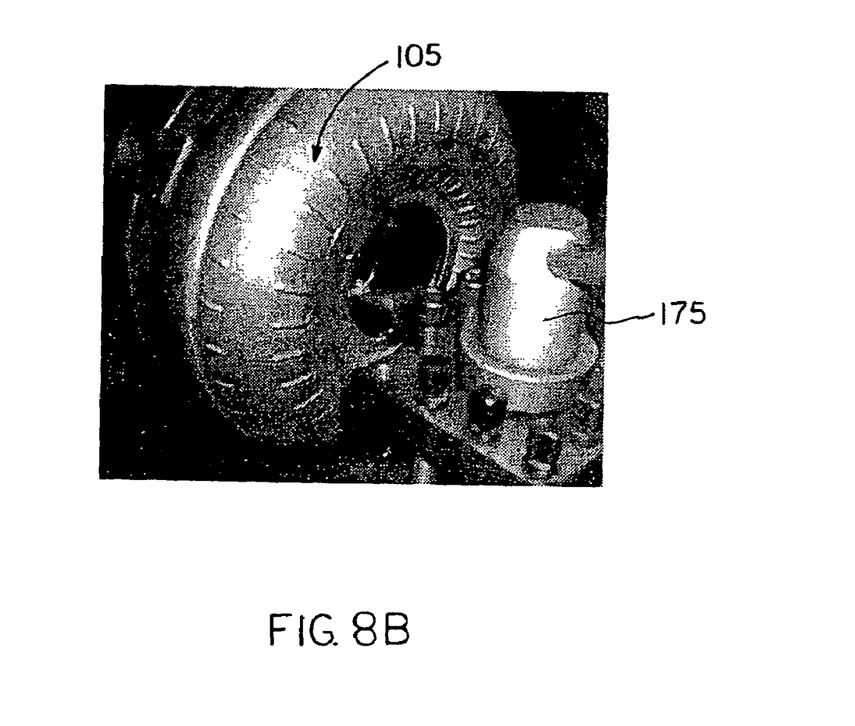
FIG. 8B is a perspective view of the exterior of an impeller assembly illustrating a boring operation on an engine lathe in accordance with the present repair method.
Figure 8C:
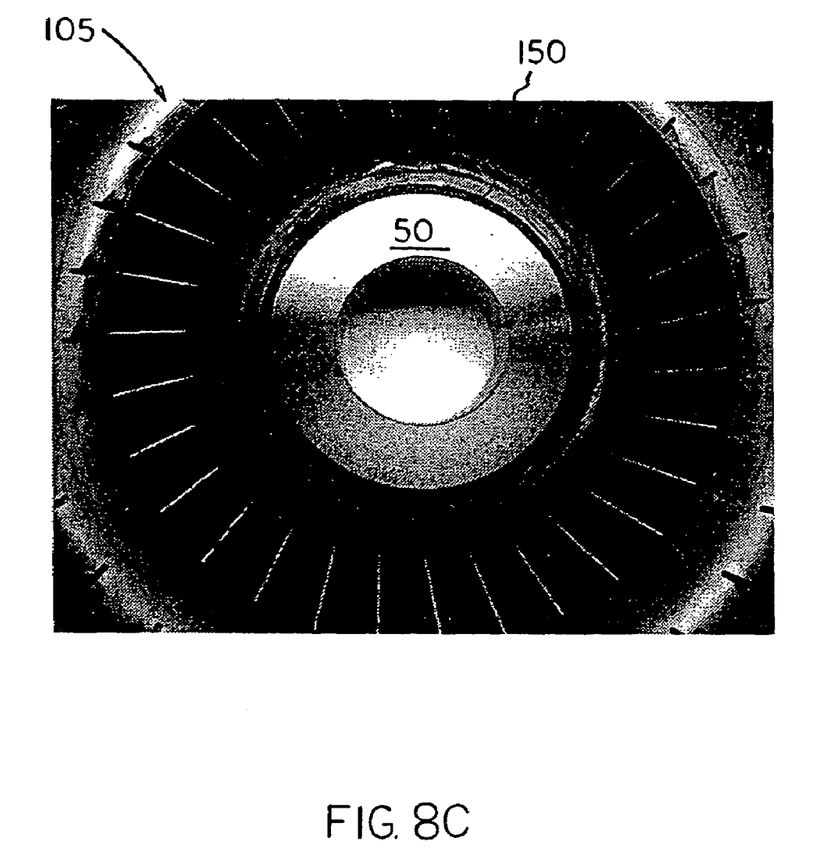
FIG. 8C is a perspective view of the interior of an impeller assembly illustrating a welding operation in accordance with the present repair method being performed on the present flanged impeller hub shown in FIG. 6A.

In accordance with a method of the present invention the impeller hub 10" is utilized to repair a worn original equipment (hereinafter "OE") impeller assembly 105 to avoid the cost of a new OE replacement. Referring to FIG. 8A the worn OE impeller assembly 105 is initially chucked in an engine lathe 175 by locating on the hub 104 and the inside surface of the housing 130a is machined to provide a flat mating surface to receive the present flanged hub 10" (FIG. 6A) as shown. Next, the inside diameter is rough bored to a predetermined dimension to cut away the worn OE impeller hub 104. Thereafter, the impeller assembly 105 is chucked on the outside diameter of the housing and the rough bore is finished to a predetermined dimension "X" (refer to FIG. 6A) maintaining concentricity requirements as illustrated in FIG. 8B. Next, the inner impeller blades 106 are coated with an anti-splatter coating such as a spray product marketed under the tradename, ARCAIR-PRO-TEX®, and manufactured by Dynaflux, Inc., Cartersville, Ga., to prevent any adhesion of weld splatter on the impeller blades 106. Thereafter, the present hub 10" is inserted into the finished bore and welded about the flange 50 as at 150' to complete the repair as shown in FIG. 8C.

Although not specifically illustrated in the drawings, it should be understood that additional equipment and structural components will be provided as necessary and that all of the components described above are arranged and supported in an appropriate fashion to form a complete and operative replacement hub impeller incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An impeller hub for use in combination with an impeller assembly attached to an engine of a land vehicle for driving engagement of a hydraulic pump within an automatic transmission of said vehicle, said impeller hub comprising:
    a tubular body member including a forward end for attachment to said impeller assembly and an aft end having a pilot diameter formed thereon;
    a bearing journal machined on an outside diameter of said tubular body member, said bearing journal conforming to a geometric roundness characteristic of 0.0003 inch maximum in accordance with ANSI Y 14.5M specification definitions, said bearing journal further conforming to a surface texture measuring 16 maximum in accordance with ANSI Y 14.36M specification definitions to provide an optimal sealing surface; and
    pump engaging means formed on said pilot diameter for driving engagement with a mating pump gear disposed within said hydraulic pump.

2. The impeller hub of claim 1 further including an annular weld relief groove formed adjacent to said forward end at a predetermined axial location, said weld relief groove providing clearance for any weld overrun extending onto said body member after said impeller hub is attached to said impeller assembly by weldment.

3. The impeller hub of claim 2 wherein said impeller hub is hardened in accordance with MIL-H-6875 to obtain a Rockwell scale hardness of 30-35.

4. The impeller hub of claim 3 wherein said pump engaging means includes a pair of parallel flats formed 180 degrees apart on said pilot diameter and defining a double D-shaped cross-section of said pilot diameter at an aft end face of said impeller hub, said flats engaging a mating double D-shaped bore formed within said mating pump gear.

5. The impeller hub of claim 4 wherein said pump engaging means further includes fillet radii formed at each juncture of said parallel flats and said aft end face of said impeller hub to facilitate sliding engagement thereof into said mating pump gear.

6. The impeller hub of claim 5 wherein said fillet radii measure in the range of 0.025-0.075 inch.

7. The impeller hub of claim 3 wherein said pilot diameter includes a fillet radius formed on said aft end of said pilot diameter to avoid damage to an O-ring seal disposed within said hydraulic pump during installation of said pilot diameter into said pump.

8. The impeller hub of claim 7 wherein said fillet radius measures in the range of 0.040-0.060 inch.

9. An impeller hub for use in combination with an impeller assembly attached to an engine of a land vehicle for driving engagement of a hydraulic pump within an automatic transmission of said vehicle, said impeller hub comprising:
    a tubular body member including a longitudinal bore extending the length thereof, said tubular body member including a forward end for attachment by weldment to said impeller assembly and an aft end having a pilot diameter for engagement with said hydraulic pump;
    a bearing journal machined on an outside diameter of said tubular body member, said bearing journal conforming to a geometric roundness characteristic of 0.0003 inch maximum in accordance with ANSI Y 14.5M specification definitions, said bearing journal further conforming to a surface texture measuring 16 maximum in accordance with ANSI Y 14.36M specification definitions to provide an optimal sealing surface on said bearing journal;
    pump engaging means formed on said pilot diameter for driving engagement of a mating pump gear disposed within said hydraulic pump, said pump engaging means including a pair of diametrically opposed, parallel flats formed 180 degrees apart on said pilot diameter, said parallel flats defining a double D-shaped cross-section of said pilot diameter at an aft end face of said impeller hub, said parallel flats engaging a mating double D-shaped bore formed within a pump gear driven by said impeller hub; and
    an annular weld relief groove formed adjacent to said forward end at a predetermined axial location, said weld relief groove providing clearance for any weld overrun extending onto said bearing journal after said impeller hub is attached to said impeller housing by weldment.

10. The impeller hub of claim 9 wherein said pump engaging means further includes fillet radii formed at each juncture of said parallel flats and said aft end face of said impeller to facilitate sliding engagement of said parallel flats into said pump gear during assembly.

11. The impeller hub of claim 9 wherein said fillet radii measure in the range of 0.025-0.075 inch.

12. The impeller hub of claim 11 wherein said pilot diameter includes a fillet radius formed on said aft end of said pilot diameter to prevent cutting damage to an O-ring seal disposed within said hydraulic pump during installation of said pilot diameter into said pump.

13. The impeller hub of claim 12 wherein said fillet radius measures in the range of 0.040-0.060 inch.

14. An improved impeller hub for use in combination with an impeller housing attached to an engine of a land vehicle for driving engagement of a hydraulic pump within an automatic transmission of said vehicle, said impeller hub comprising a tubular body member having a forward end attached by weldment to said impeller housing and an aft end including a pilot diameter for engagement of a mating pump gear within the hydraulic pump of said transmission, said improvements comprising:

a bearing journal machined on an outside diameter of said tubular body member, said bearing journal conforming to a geometric roundness characteristic of 0.0003 inch maximum in accordance with ANSI Y 14.5M specification definitions, said bearing journal further conforming to a surface texture measuring 16 maximum in accordance with ANSI Y 14.36M specification definitions;

pump engaging means formed on said pilot diameter for driving engagement of said mating pump gear disposed within said hydraulic pump, said pump engaging means including a pair of diametrically opposed, parallel flats formed on said pilot diameter, said parallel flats defining a double D-shaped cross-section of said pilot diameter at an aft end face of said impeller hub, said parallel flats engaging a mating double D-shaped bore formed within said pump gear, said pump engaging means further including fillet radii formed at each juncture of said parallel flats and said aft end face of said impeller to facilitate sliding engagement of said parallel flats into said double D-shaped bore within said pump gear at assembly; and     an annular weld relief groove formed adjacent to said forward end at a predetermined axial location, said weld relief groove providing clearance for any weld overrun extending onto said body member after said impeller hub is attached to said impeller housing by weldment.

15. The impeller hub of claim 14 wherein said pilot diameter includes a fillet radius formed on said aft end of said pilot diameter to prevent cutting damage to an O-ring seal disposed within said hydraulic pump during installation of said pilot diameter into said pump.

16. The impeller hub of claim 15 wherein said fillet radius measures in the range of 0.040-0.060 inch.

17. An impeller hub for use in combination with an impeller assembly attached to an engine of a land vehicle for driving engagement of a hydraulic pump within an automatic transmission of said vehicle, said impeller hub comprising:

a tubular body member having a longitudinal bore extending the length thereof, said body member including a forward end having a circular flange formed thereon in perpendicular relation to said bore for attachment to said impeller assembly and an aft end having a pilot diameter formed thereon;

a bearing journal machined on an outside diameter of said tubular body member, said bearing journal conforming to a geometric roundness characteristic of 0.0003 inch maximum in accordance with ANSI Y 14.5M specification definitions, said bearing journal further conforming to a surface texture of at most 16 in accordance with ANSI Y 14.36M specification definitions to provide an optimal sealing surface; and     pump engaging means formed on said pilot diameter for driving engagement with a mating pump gear disposed within said hydraulic pump.

18. The impeller hub of claim 17 wherein said pump engaging means includes a pair of diametrically opposed, parallel flats formed on said pilot diameter and defining a double D-shaped cross-section of said pilot diameter at an aft end face of said impeller hub, said flats engaging a mating double D-shaped bore formed within said mating pump gear.

19. The impeller hub of claim 18 wherein said pump engaging means further includes fillet radii formed at each juncture of said parallel flats and said aft end face of said impeller to facilitate sliding engagement of said pump engaging means into said mating pump gear.

20. The impeller hub of claim 19 wherein said fillet radii measure in the range of 0.025-0.075 inch.

\* \* \* \* \*